United States Patent [19]

Watanabe

[11] Patent Number: 5,002,900

[45] Date of Patent: Mar. 26, 1991

[54] METHOD OF PRODUCING SEMICONDUCTOR MOTOR

[75] Inventor: Toshiaki Watanabe, Yatabe, Japan

[73] Assignee: Akio Takahashi, Japan

[21] Appl. No.: 404,322

[22] Filed: Sep. 7, 1989

Related U.S. Application Data

[62] Division of Ser. No. 269,454, Nov. 9, 1988.

[30] Foreign Application Priority Data

Dec. 8, 1987 [JP] Japan ................... 62-308553

[51] Int. Cl.$^5$ ............................ H02K 15/00
[52] U.S. Cl. .................... 437/225; 437/226; 437/227; 437/230; 29/596
[58] Field of Search ........... 310/308, 309; 29/596; 437/225, 226, 227, 230

[56] References Cited

U.S. PATENT DOCUMENTS

| | | | |
|---|---|---|---|
| 3,629,624 | 12/1971 | Gates et al. | 437/226 |
| 4,033,027 | 7/1977 | Fair et al. | 437/226 |
| 4,504,757 | 3/1985 | Spratt | 310/308 |
| 4,612,486 | 9/1986 | Ban | 318/254 |
| 4,698,563 | 10/1987 | Ban | 318/254 |
| 4,754,185 | 6/1988 | Gabriel et al. | 310/309 |

Primary Examiner—Olik Chaudhuri
Assistant Examiner—Ourmazd S. Ojan
Attorney, Agent, or Firm—Bruce L. Adams; Van C. Wilks

[57] ABSTRACT

A motor is disclosed wherein electro-static repulsion and attraction between electrically charged electrodes provided on a stator and the charges on the surface of a pair of rotor electrodes are used to drive the rotor to rotate within the stator. In another embodiment the moving element is a rod or plate disposed for linear movement in an axial direction according to the charges developed in the stator electrode. The moving element electrode may have a lead by which it can be directly connected to an electric potential or it may be completely isolated from ground and from any electric potential.

18 Claims, 7 Drawing Sheets

METHOD OF PRODUCING SEMICONDUCTOR MOTOR

This is a divisional, of application Ser. No. 269,454, filed Nov. 9, 1988.

FIELD OF THE INVENTION

The present invention relates to a motor wherein static electric repulsion is employed as the motive force.

BACKGROUND OF THE INVENTION

Electric motors and relays employing electro-magnetism generated in a coil as the motive force have been well known for a number of years. Such devices invariably comprise a moving element and a stationary element on at least one of which is provided a coil through which electrical current is passed to create an electromagnetic field which acts on another coil, a magnet, or a ferrous member provided on the other of the two elements to provide a motive force by which relative movement between the two elements is effected.

As is well known, such motors have functioned well in a nearly infinite variety applications since their inception, however they do suffer certain drawbacks a few of which are set out below.

In the case of an analogue watch, for example, if an electro-magnetic motor is employed to drive the clock mechanism, strong outside magnetic fields can have an adverse effect on the accuracy of the clock mechanism. What is more, because of the requirement in such motors of a coil having an adequate number of turns to provide an electro-magnetic field of a desired strength in response to the passage of electrical current therethrough, it is impossible to make them smaller than the minimum size of such a coil, thus making it difficult to reduce the size and thickness of the watch.

SUMMARY OF THE INVENTION

In view of the abovementioned problems encountered with conventional electro-magnetic motors according to the prior art, it is among the objects of the present invention to provide a motor which is not easily affected by outside magnetic fields.

It is another object of the present invention to provide a motor which is inexpensive to produce and can be made very small and light.

It still a further aim of the instant invention to provide a motor wherein the speed and position of the moving element can be controlled very accurately.

The above problems and others can be solved according to the invention by providing a motor wherein electrostatic repulsion and/or attraction or are employed as the motive force. To achieve this, electrodes are provided on both the moving element and the stationary member. The electrodes on the respective members are arranged so that they may be in close proximity to each other without touching. By inducing an electrostatic charge in the respective electrodes, an electrostatic or "Coulomb" force acts between charges of the respective electrodes to attract a point on the other of the electrodes if the charge thereat is opposite or to repel it if the charge is the same. By altering the charge in at least one of the electrodes in a controlled fashion, relative movement between the respective members can be achieved.

According to one embodiment of the invention, a pair of electrodes, formed of a P-type semiconducter in which only the holes act as charge carriers, are provided on a moving element which in this case is a rotor and a plurality of electrodes are arranged, on a stator element, around the periphery of the area in which the rotor electrodes move. Each of the rotor electrodes in this embodiment is completely insulated and electrically isolated by some insulating material provided on the rotor or from which the rotor is made, and is slightly longer than the individual stator electrodes.

The outer surfaces of the pair of electrically isolated P-type rotor electrodes are in close proximity to, but not touching, the stator electrodes so that the rotor electrodes and the stator electrodes face each other across a small gap. The stator electrodes are formed of some metallic conductor, are electrically insulated from each other and each has one lead which may be selectively connected to either a positive voltage source or a negative voltage source so as to give it an electric potential or charge which may be selected according to the terminal of the source.

A positive voltage is applied to one of the stator electrodes which is in proximity to one side of the rotor electrode, the positive charge induced in the stator electrode acting to draw the electrons in the rotor electrode and to repel the holes with the result that the holes move to the end of the rotor electrode that is farthest from the positively charged electrode. At the same time a stator electrode at the side of the positively charged one that is closest to the side of the rotor electrode to which the holes move is connected to a negative voltage source so that the force of attraction between the negatively charged electrode is added to the force of repulsion on the holes by the positively charged electrode to, in effect, drive the holes against one end of the rotor electrode.

Since the electrode is formed of a P-type semiconductor, the electrons of the rotor electrode on the other hand are the minority carriers and are not free to accumulate at the end thereof that is closest to the positively charged stator electrode and remain more or less evenly distributed throughout the rotor electrode. Therefore, since the force of attraction between oppositely charged points increases exponentially with proximity, and since the electrons of the rotor electrode are essentially immobile within the P-type semiconductor material from which the electrode is formed, the attraction between electrons of the rotor electrode and the positively charged stator electrode remains relatively weak compared to the attraction between the holes of the rotor electrode and the negatively charged stator electrode. Consequently, the rotor electrode becomes drawn in the direction of the negatively charged stator electrode, which sets the rotor in motion. Once the rotor is thus set in motion the electrodes are disconnected from the respective power source terminals.

When the momentum of the rotor carries the electrode to a position where it is approximately opposite the stator electrode that was negatively charged, the stator electrode which was previously negatively charged is connected to a positive voltage and at the same time, a stator electrode at the side of the now negatively charged electrode that is in the direction of rotation of the rotor, is connected to a negative voltage. As before, the now positively charged stator electrode repels the holes, and the negatively charged stator electrode attracts the holes of the rotor electrode thereby again imparting a motive force to the rotor in the direction in which it has already been set in motion as set out above.

The above switching process of the stator electrodes is repeated stepwise around the stator in synchronism with the rotor rotating therewithin so as to impart motive force on the rotor the shaft of which may serve as a power output of the motor.

Alternatively, the rotor electrodes may be formed of an N-type semiconductor, or of a metallic conductor. In cases where the rotor electrode is of a metalic conductor however, the risk of an arc discharge between the rotor and stator electrodes is increased.

In another embodiment the moving member is a rod or plate disposed so as to move in a linear fashion within the stator and the stator electrodes are arranged in sequence along a linear travel path defined within the stator. The switching of the electrodes is the same as in the embodiment described above and as in the above described embodiment, the electrode is formed of a P-type semiconducting material.

In another embodiment of the instant invention the electrodes of both the moving member and the stationary member are connected to a voltage source.

In an embodiment characterizing this feature, exactly as in the above described embodiment comprising a rotor, the periphery of the stator is formed with a plurality of electrodes which may be selectively connected to either a positive or negative voltage and which are switched in essentially the same manner as described above. The rotor comprises a pair of electrodes which, on the other hand, remain connected to one of either a positive or a negative voltage at all times while the motor is in operation. If the rotor electrodes are constantly connected to the positive terminal of the power source, the stator electrode closest thereto is connected to positive, and the stator electrode to one side of the positive electrode is connected to negative. The positively charged rotor electrode is therefore repelled by the positively charged stator electrode and attracted toward the negatively charged stator electrode. As before, when the rotor electrode reaches a position where it is opposite the negatively charged electrode, the polarity of the electrode is switched to positive and at the same time the previously positive electrode is disconnected from the power source and the electrode on the other side of the positive electrode that is in the direction of rotation of the rotor is connected to a negative terminal of the power source, thus the positively charged rotor electrode is repelled by the positive stator electrode and is attracted by the negative stator electrode.

In yet another embodiment of the present invention the electrodes are arranged about the stator in the same manner as described above, as are the electrodes of the rotor, and are switched from negative to positive in the same manner. The embodiment differs however in that a layer of dielectric material is arranged on the inner surfaces of the stator electrodes that face the rotor electrodes. When a positive potential is applied to one of the stator electrodes, the electrons migrate to the side of the dielectric material facing the stator electrode and the holes of the dielectric material go to the opposite side of the dielectric material which faces the rotor electrode. Conversely when a negative voltage is applied to the adjacent electrode of the stator element, the holes of the dielectric material migrate toward the surface of the dielectric material which faces the rotor electrode. Thus negatively and positively charged portions are formed in the dielectric material at positions corresponding to the positions of the stator electrodes. These charged areas act, as did the stator electrodes in the above described embodiments, to repel or attract the holes in the P-type rotor electrode and thereby impart a motive force on the rotor.

In another embodiment of the present invention P-type and N-type semiconductor layers are formed alternatingly on the inner sides of the stator electrodes which are switched, as in the other embodiments, alternately from negative to positive in synchronism with the rotation of the rotor.

Still other embodiments and variants of the instant invention will become clearly understood from the following detailed disclosure and figures which however are not intended to imply limits to the invention but are only for clarification of the principles on which an electrostatic motor according to the invention functions.

DETAILED DESCRIPTION OF THE EMBODIMENTS

Figure 1:
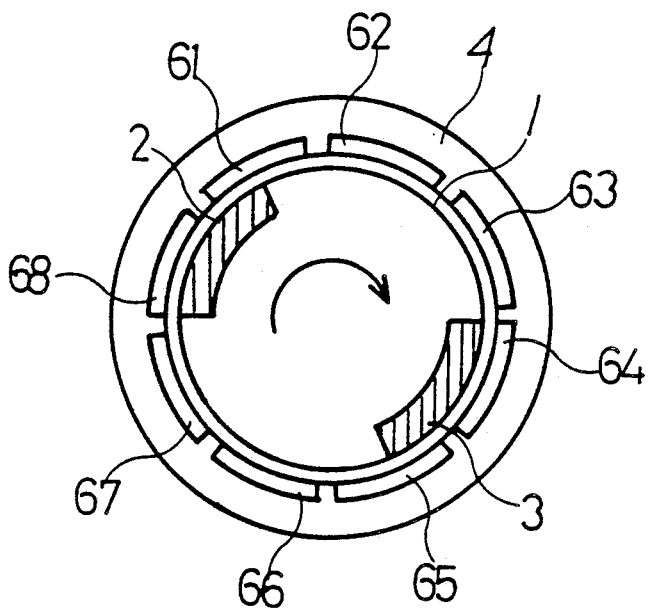
In FIG. 1 the first embodiment of the invention is depicted as it would appear viewed from the axial end of the rotor.

Referring now to the figures, FIG. 1 is a side elevation of the first embodiment of the invention viewed from the axial end of a rotor 1 rotatably mounted within a stator 4.

The rotor 1 and the body of the stator 4 are formed of an insulating material such as an intrinsic semiconductor, plastic, glass, ceramic or the like. Thus, the stator electrodes 61-68, which are disposed at regular intervals around the inner periphery of the stator and spaced by a predetermined gap width, are insulated from each other and from the outside of the stator casing.

Each of the stator electrodes 61-68 is formed of a conducting material and comprises a lead 7 which may independently be selectively connected to a positive or a negative terminal of a power source (not shown) so as to give it a positive or a negative potential.

The rotor comprises a pair symetrically opposed electrodes 2 and 3 which in the case of the embodiment of FIG. 1 are formed of a P-type semiconducting material and are completely insulated from each other, from ground, and from the power source. The rotor electrodes 2 and 3 face the stator electrodes 61 through 68 across a small gap and cannot come into contact with the stator electrodes through rotation of the rotor.

Preferably the circumferential length of the rotor electrode is less than the distance between the opposite ends of adjacent stator electrodes. In the FIG. 1 embodiment, the length of the rotor electrodes is set as being approximately equal to the width of one of the gaps between the stator electrodes plus 1.5 times the length of the individual stator electrodes.

With the configuration set out above, when the rotor is in the position shown in FIG. 1 and the stator electrodes 68 and 64 are connected to positive, the holes in the respective electrodes 2 and 3, which are the majority carriers, are repelled by the holes in the positively charged electrodes and move towards the end of the rotor electrode that is farthest from the positive stator electrodes. The electrons in the electrodes 2 and 3, on the other hand, which are the minority carriers, are relatively immobile within the electrodes and therefore even though they are attracted to the positive stator electrode they cannot collect at the ends of the respective rotor electrodes that are closest to the positive stator electrode. Therefore, since the positive rotor holes remain at some distance from the stator electrode the attraction therebetween remains weak.

While the stator electrodes 68 and 64 are connected to positive as set out above, the adjacent stator electrodes 61 and 65 are connected to negative. Therefore, the holes of the rotor electrodes are attracted by the negative stator electrodes 61 and 65 and, since they can move no further towards the negative stator electrodes while remaining within the rotor electrodes and they cannot leave the rotor electrodes because they are insulated, the holes exert pressure on the ends of the respective rotor electrodes 2 and 3 in the direction of the negatively charged stator electrodes which moves the rotor in the direction indicated by the arrow in FIG. 1.

When the rotor moves to a position where the electrodes 2 and 3 are approximately opposite the electrodes 61 and 65, the electrodes 61 and 65 are disconnected from the negative terminal of the power source and are connected to the positive terminal of the power source and the electrodes 62 and 66 are connected to the negative terminal of the power source. Therefore, the holes or positive charges in the respective electrodes 2 and 3 are repelled by the now positive electrodes 61 and 65, and are attracted towards the now negative electrodes 62 and 66, with the result that a motive force is again applied to the rotor 1 in the direction indicated by the arrow.

The above process is repeated around the stator as the rotor rotates within the stator, and the pairs of electrodes which are connected so as to be oppositely polarized are shifted clockwise around the stator in syncronism with the rotation of the rotor.

It will be appreciated that exactly the same effect as set out above can be achieved if the electrodes 2 and 3 are formed of an N-type semiconducting material and the stator electrodes are connected such that their polarities are exactly the opposite of those set out above.

It will further be appreciated that movement may also be effected if the rotor electrodes are formed of a metallic conducting material however in doing so the risk of a discharge or arc is increased.

Figure 2:
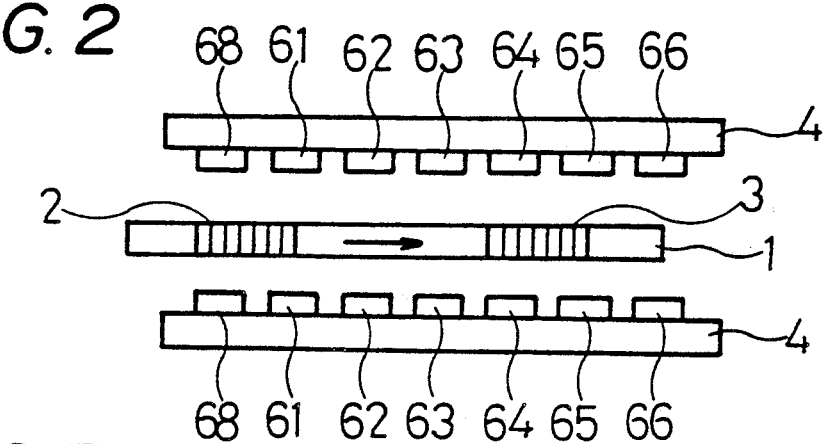
FIG. 2 is a side elevation of the second embodiment of the present invention.

In the embodiment shown in FIG. 2, the means for inducing motion in the moving element 1 is exactly the same as that set above with regard to the first embodiment. The differences in the second embodiment being that the moving element 1 is not a rotor but is a rod or plate, formed integrally with flat electrodes 2 and 3, and disposed so as to move linearly along the axis of the arrow, and the electrodes 61-68 are formed as bands opposing the electrodes 2 and 3 of the plate.

For convenience of disclosure the corresponding elements in the figs. have been assigned similar reference numerals, therefore it will be understood that the above description made with respect to the first embodiment can be applied directly to the second embodiment depicted in FIG. 2 if it is understood that the movement of the moving element is linear and not rotational and that the stator of the second embodiment comprises fewer electrodes than that of the first.

Figure 3:
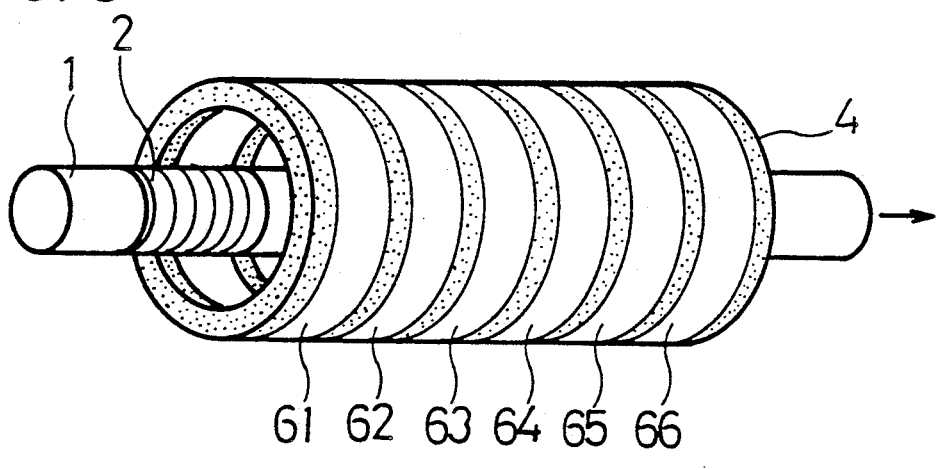
FIG. 3 is a perspective view of the third embodiment of the invention, in which it will be noted that some of the electrodes of the moving element are obscured from view within the cylindrical structure of the stator.

In the third embodiment shown in FIG. 3, again the description of the operation given above with regard to the first embodiment may be considered to apply with the exception that the moving element of the third embodiment is a rod 1 formed integrally with electrodes 2 and 3 (electrode 3 not visible in the fig), and disposed so as to move axially within the stator 4 which comprises electrodes 61-66 which in the third embodiment are formed as annular bands arranged sequentially along the travel path of the moving element 1. Thus again as in the second embodiment, the description of the operation given above with regard to the first embodiment may be considered to apply as long as it is understood that the movement induced in the moving member 1 of the third embodiment is axial and not rotational as in the first embodiment.

Figure 4:
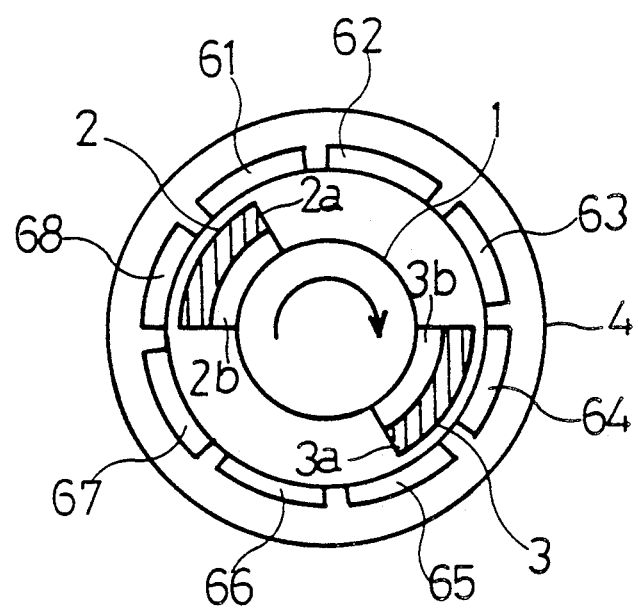
In FIG. 4 the fourth embodiment of the invention is depicted as it would appear viewed from the axial end of the rotor.

In the fourth embodiment depicted in FIG. 4 the stator 4 and stator electrodes 61-68 are exactly like those set out in with respect to the first embodiment however the the fourth embodiment varies form the embodiments set out above in that the electrodes 2a and 3a which are formed of an N-type semiconducting material are disposed on metallic electrodes 2b and 3b respectively which are mounted on the rotor 1 of the fourth embodiment and which are constantly connected to the negative terminal of a power source while the motor is operating via a lead 8. Thus the electrons which are the majority carriers in the N-type material of the rotor electrodes are pushed within the electrodes 2a and 3a toward the surfaces of the respective rotor electrodes which face the stator electrodes.

As in the previous embodiments set forth above the stator electrodes can 61 and 68 be selectively connected to the positive or negative terminals of a power source.

Thus when the rotor electrodes 2 and 3 of the fourth embodiment are in the positions shown in FIG. 4, the stator electrodes 64 and 68 are connected to negative and the stator electrodes 61 and 65 are connected to positive. In this condition, since the electrons, which are the majority carriers, of the rotor electrodes are pushed toward the sides of the respective rotor electrodes that face the stator electrodes by the negative potential of the metallic electrodes 2b and 3b respectively, they are in close proximity to the negative potential electrodes 68 and 64 by which they are repelled and at another portion of the respective rotor electrodes, are in proximity to the positive potential electrodes 61 and 65 by which they are attracted. The net effect of this relationship is that the rotor electrodes 2a and 3a are repelled by the stator electrodes 68 and 64, and are attracted by the stator electrodes 61 and 65 which causes the rotor to rotate, in the direction indicated by the arrow in FIG. 4, to a position in which the rotor electrodes are opposite the positive stator electrodes 61 and 65.

When the rotor 1 reaches the position in which the electrodes 2a and 3a are opposite the stator electrodes 61 and 65, the potential of the stator electrodes 61 and 65 is changed to negative and the electrodes 62 and 66 are connected to positive so that the rotor electrodes are again propelled in the direction indicated by the arrow by the mutual repulsion between the electrodes 2a and 3a and the now negative electrodes 61 and 65, and by the mutual attraction between the rotor electrodes 2a and 2b and the now positive electrodes 62 and 66.

Thus as before the polarity of the stator electrodes is switched such that the each time one of the rotor electrodes comes directly opposite or slightly beyond the position directly opposite a particular stator electrode, the polarity of the stator electrode is switched so as to repel the rotor electrode and thus propel the rotor in the chosen direction, and the force of this propulsion is augmented by the attraction to the stator electrode adjacent the repelling stator electrode which is polarized so as to attract the rotor electrode.

The stator electrodes are switched in the above fashion sequentially about the stator in synchronism with the rotation of the rotor within the stator, or conversely it may be said that the rotor rotates in accordance with the switching states of the stator electrodes.

It will here be noted that the switching means (not shown) of the electrodes may take a mechanical form such as brushes engaging contacts formed on the rotor in the manner essentially well known in the art of electric motors, or the electrodes may be switched by electronic switching means in which case the timing of the switching of the respective stator electrodes may be precisely controlled so as to provide precise control over the speed of rotation and positional orientation of the rotor 1.

It will be noted that in the stator, the positive connection to the power source may be omitted and the rotor can be driven by the repulsion between the negative electrodes alone, or alternatively the negative connection to the power source may be omitted and the rotor can be driven by attraction between oppositely polarized electrodes alone. In the former case, where only repulsion between similar polarity electrodes is used, the voltage may be made fairly high without any danger of discharge.

It will also be noted that the rotor electrodes may alternatively be formed of a P-type semiconducting material and the polarities of the respective electrodes made the reverse of that set out above.

It should still further be noted that, although in the embodiments shown a plurality of electrodes are provided on the rotor, embodiments are possible wherein only a single electrode is provided on the moving element.

Figure 5:
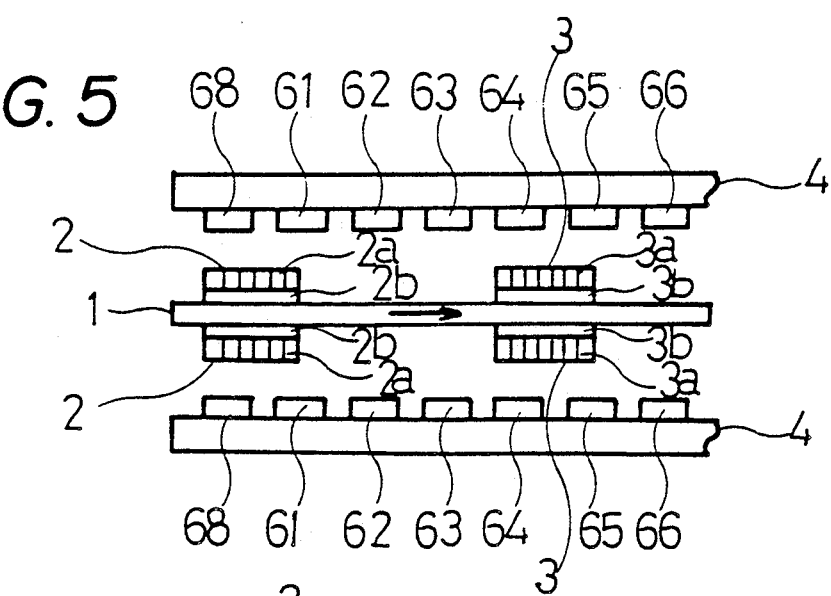
FIG. 5 is a side elevation of the fifth embodiment of the present invention.

The fifth embodiment shown in FIG. 5 works exactly according to the principles set out above with respect to the fourth embodiment with the exception that the moving element of the fifth embodiment is a rod or plate disposed so as to be movable along the axis of the arrow in FIG. 4 and the stator 4 comprises band shaped electrodes 61-68 formed above and below the moving element.

For convenience of disclosure the reference numerals used above in connection with the fourth embodiment have been used to denote corresponding elements in the fifth embodiment. It will be understood that the description set out above with regard to the fourth embodiment may be considered to apply to the fifth embodiment depicted in FIG. 5 with the exception that the moving element 1 is driven in a linear fashion rather than in the rotary fashion set out with respect to the fourth embodiment.

Figure 6:
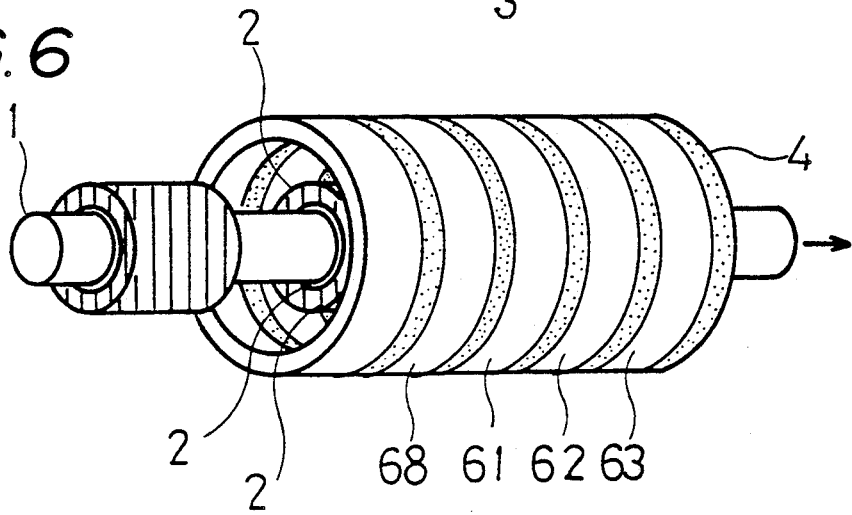
FIG. 6 is a perspective view of the sixth embodiment of the invention, in which it will be noted that some of the electrodes of the moving element are obscured from view within the cylindrical structure of the stator.

Similarly to the fifth embodiment, the sixth embodiment shown in FIG. 6 works exactly according to the principles set out above with respect to the fourth embodiment with the exception that the moving element of the fifth embodiment is a rod disposed so as to be movable along the axis of the arrow, and the stator 4 is cylindrical and comprises annular band shaped electrodes 61-68 formed around the travel path of the moving element.

For convenience of disclosure the reference numerals used above in connection with the fourth embodiment have been used to denote corresponding elements in the sixth embodiment. It will be understood that the description set out above with regard to the fourth embodiment may be considered to apply to the sixth embodiment depicted in FIG. 6 with the exception that the moving element 1 is driven in a linear fashion rather than in the rotary fashion set out with respect to the fourth embodiment.

Figure 7:
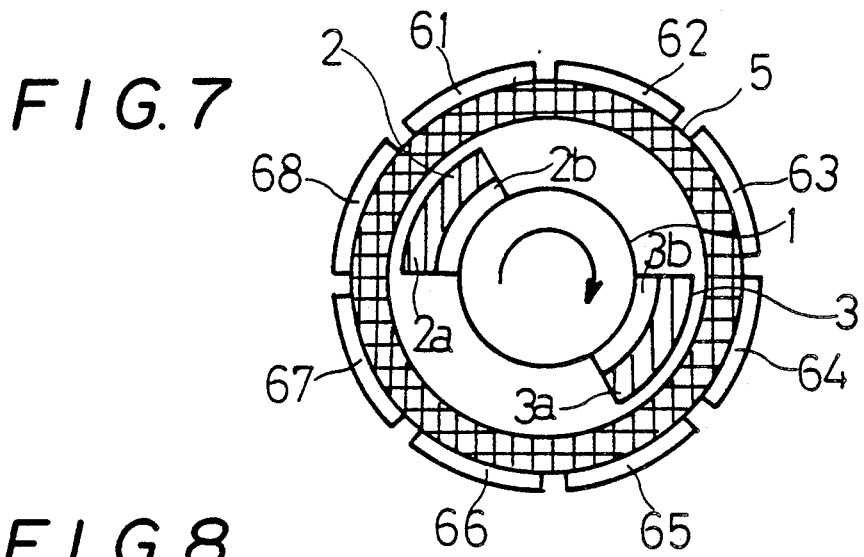
In FIG. 7 the seventh embodiment of the invention is depicted as it would appear viewed from the axial end of the rotor.

In a seventh embodiment of the instant invention depicted in FIG. 7 the rotor 1 and rotor electrodes are exactly similar to those disclosed above in the disclosure of the fourth embodiment. The stator of the seventh embodiment on the other hand comprises stator electrodes arranged around the circumference as in the first and fourth embodiments with the same spacing and lengths relative to the rotor electrodes set out in the disclosure of the first embodiment. The seventh embodiment of the invention varies from the previously disclosed embodiments in that the stator comprises a layer 5 of dielectric material to which the inner faces of the stator electrodes 61-68 are connected.

A small gap is defined between the inner circumference of the layer 5 of dielectric material and the surface of the rotor electrodes 2a and 3a.

The stator electrodes 61-68 are selectively connectable to the positive or negative terminal in exactly the same manner set out above with regard to the previous embodiments and, as in the fourth embodiment, the electrodes 2b and 3b are connected at all times to negative so that the electrons of the N-type semiconducting layers 2a and 3a are pushed toward the outer surfaces of the electrodes 2a and 3a.

In operation, when the rotor is in the position shown in FIG. 7, the electrodes 68 and 64 are connected to the negative terminal of the power source causing the holes of the dielectric material to be drawn towards the side of the dielectric layer mating the electrodes 64 and 68 and causing the electrons to move to the side of the dielectric layer facing the electrodes 2a and 3a. Thus a negative charge appears in the portion of the dielectric material facing the electrodes 2a and 3a, which bear negative potentials, which repels the electrons therein. At this time the electrodes 61 and 65 are connected to the positive terminal of the power source causing the electrons at the mating portion of the dielectric layer 5 to be drawn towards the electrodes 61 and 65 and the holes of the portion of the dielectric layer mating therewith to migrate to the opposite side of the dielectric layer so as to form a positively charged portion at the inner side of the dielectric layer which attracts the the negative stator electrodes 2a and 3a.

As in the previous embodiments when the rotor electrodes 2a and 3a, which as set out above are formed of N-type semiconducting material and are connected to the negative terminal of the power source through electrodes 2b and 3b, move to the positions facing the stator electrodes 61 and 65, the polarities of the stator electrodes 61 and 65 are switched so as to repel the rotor electrodes and the adjacent electrodes 62 and 66 are polarized so as to attract the rotor electrodes, and this switching operation is repeated stepwise around the stator in synchronism with the rotation of the rotor.

With this embodiment it will be appreciated that, due to the presence of the dielectric layer between the rotor electrodes and the stator electrodes, the possibility of a discharge occuring therebetween is greatly reduced.

The eighth embodiment shown in FIG. 8 works exactly according to the principles set out above with respect to the seventh embodiment with the exception that the moving element of the eighth embodiment is a rod or plate disposed so as to be movable along the axis of the arrow and the stator comprises band shaped electrodes 61-68 formed above and below the moving element and at the inner sides facing the moving elements on which are formed dielectric layers 3. For convenience of disclosure the reference numerals used above in connection with the seventh embodiment have been used to denote corresponding elements in the eighth embodiment. It will be understood that the description set out above with regard to the seventh embodiment may be considered to apply to the eighth embodiment depicted in FIG. 8 with the exception that the moving element 1 is driven in a linear fashion rather than in the rotary fashion set out with respect to the seventh embodiment.

Figure 8:
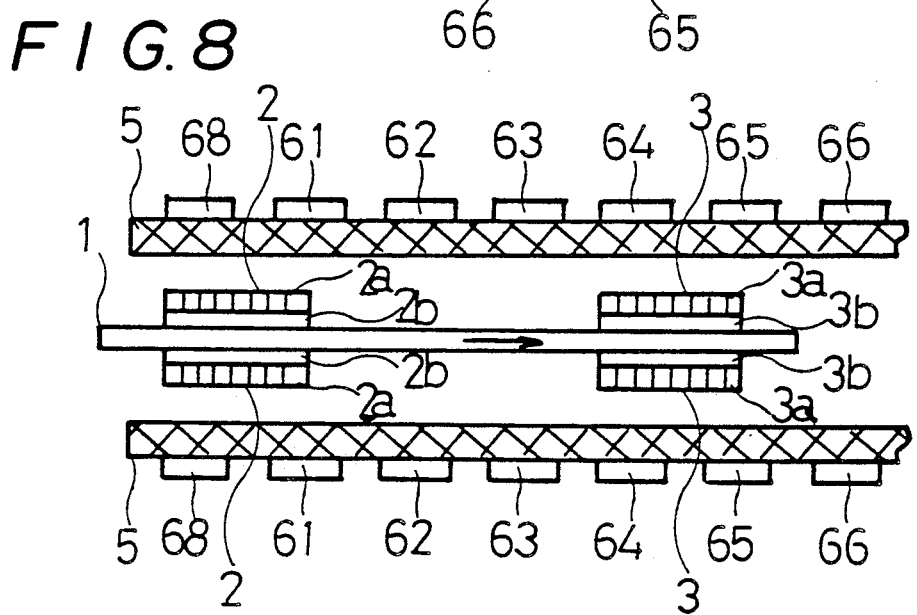
FIG. 8 is a side elevation of the eighth embodiment of the present invention.
Figure 9:
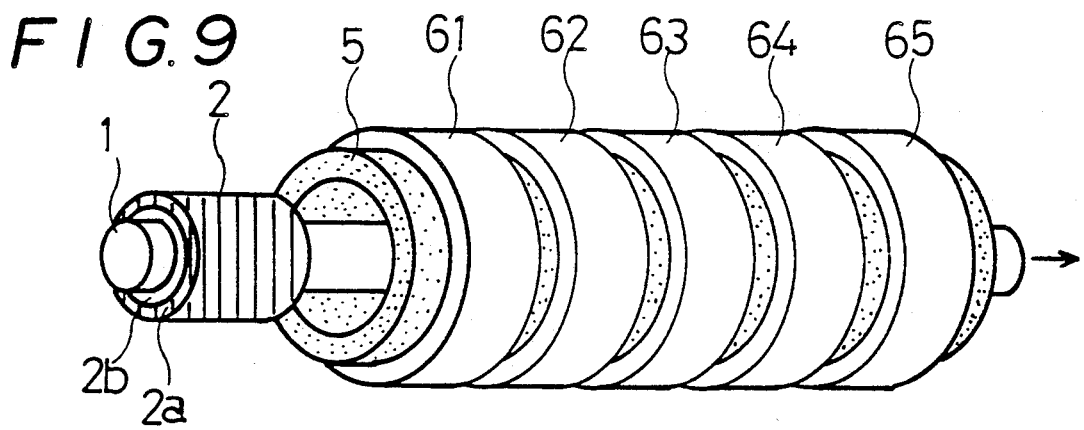
FIG. 9 is a perspective view of the ninth embodiment of the invention, in which it will be noted that some of the electrodes of the moving element are obscured from view within the cylindrical structure of the stator.

Similarly to the eighth embodiment, the ninth embodiment shown in FIG. 9 works exactly according to the principles set out above with respect to the seventh embodiment with the exception that the moving element of the eighth embodiment is a rod disposed so as to be movable along the axis of the arrow in FIG. 8, and the stator is cylindrical and comprises annular band shaped electrodes 61-68 formed around the travel path of the moving element at the innersides, facing the moving element, on which are formed dielectric layers 5.

For convenience of disclosure the reference numerals used above in connection with the seventh embodiment have been used to denote corresponding elements in the ninth embodiment. It will be understood that the description set out above with regard to the seventh embodiment may be considered to apply to the ninth embodiment depicted in FIG. 9 with the exception that the moving element 1 is driven in a linear fashion rather than in the rotary fashion set out with respect to the seventh embodiment.

Figure 10:
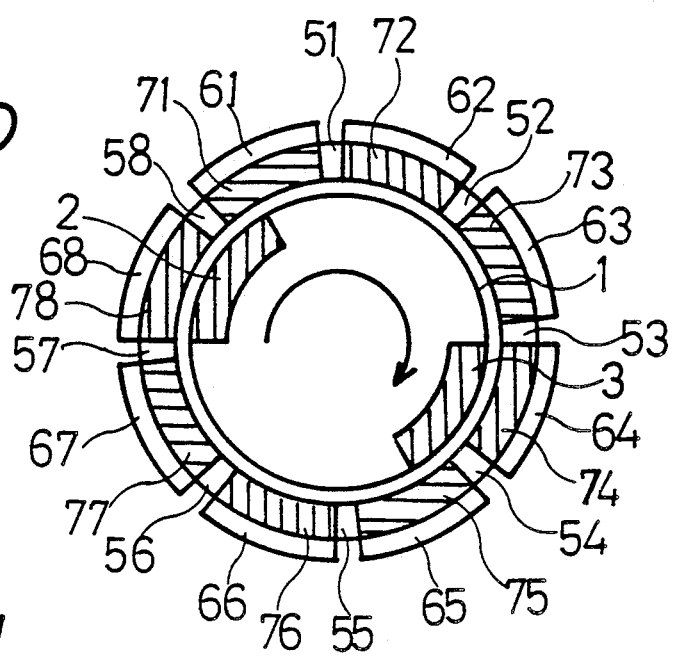
In FIG. 10 the tenth embodiment of the invention is depicted as it would appear viewed from the axial end of the rotor.

In the tenth embodiment shown in FIG. 10 the rotor electrodes 2 and 3 are formed of an N-type semiconducting material and are arranged within the stator in the same manner as the electrodes and rotor of the first embodiment so as to be galvanically isolated from each other, from ground, and from the power supply.

The stator electrodes are arranged around the stator similarly to those of the seventh embodiment except that instead of the dielectric layer provided at the inner side of the stator electrodes in the seventh embodiments, alternating P-type and N-type semiconducting layers are formed at the inner sides of the stator electrodes 61-68 and between these alternating P-type and N-type semiconductor layers are formed insulating layers 51-58. The insulating layers 51-58 serve to prevent any current flow between the adjacent semiconducting layers.

Thus, the oddly numbered semiconductor layers 71, 73, 75, and 77 formed at the inner sides of the electrodes 61, 63, 65, and 67 in FIG. 10 are formed of a P-type semiconducting material and the evenly numbered semiconducting layers 72, 74, 76, and 78 formed at the inner sides of stator electrodes 62, 64, 66, and 68 are formed of N-type semiconducting material.

In operation, when the rotor electrodes 2 and 3 are in the positions shown in FIG. 10, the stator electrodes 68 and 64 are connected to the negative terminal of the power source and the electrodes 61 and 65 are connected to the positive terminal of the power source. Under these conditions the electrons of the of the rotor electrodes 2 and 3 are repelled by the negatively charged N-type semiconductor layers 78 and 74, and are attracted by the positive semiconducting layers 71 and 75 of the stator, therefore the electrons move within the rotor electrodes 2 and 3 to the end nearest the positively charged stator electrodes 61 and 75, and when they can move no further within the electrodes 2 and 3, they exert pressure on the ends of the electrodes 2 and 3 which causes the rotor to move in the direction indicated by the arrow in FIG. 10.

When the rotor reaches a position where the electrodes 2 and 3 are opposite the stator electrodes 61 and 65, they are disconnected from the positive terminal of the power source and are connected to the negative terminal of the power source. Thus, the holes of the P-type semiconductor layers 71 and 75 are attracted to the stator electrodes 61 and 65 and move toward the sides of the respective P-type semiconductor layers closest thereto, leaving only the electrons, which are the minority carriers, at the sides of the respective layers facing the rotor electrodes 2 and 3. Thus the electrons of the electrodes are repelled by the electrons at the surface of the semiconducting layers 71 and 75.

At this time the electrodes 62 and 66 are connected to positive, attracting the electrons of the semiconducting layers 72 and 76, and leaving only holes the at the inner surfaces of the respective layers, which attract the electrons of the rotor electrodes and thus attract the rotor electrodes 2 and 3 so as to move the rotor in the direction shown by the arrow.

Thus as in the previous embodiments the polarities of the respective stator electrodes 61-68 are switched stepwise in synchronism with the rotation of the rotor within the stator so as to apply a motive force to the rotor.

With this embodiment as with the embodiments above comprising the dielectric layer, the possibility of discharge occuring across the gap between the rotor electrodes and stator electrodes is reduced.

Figure 11:
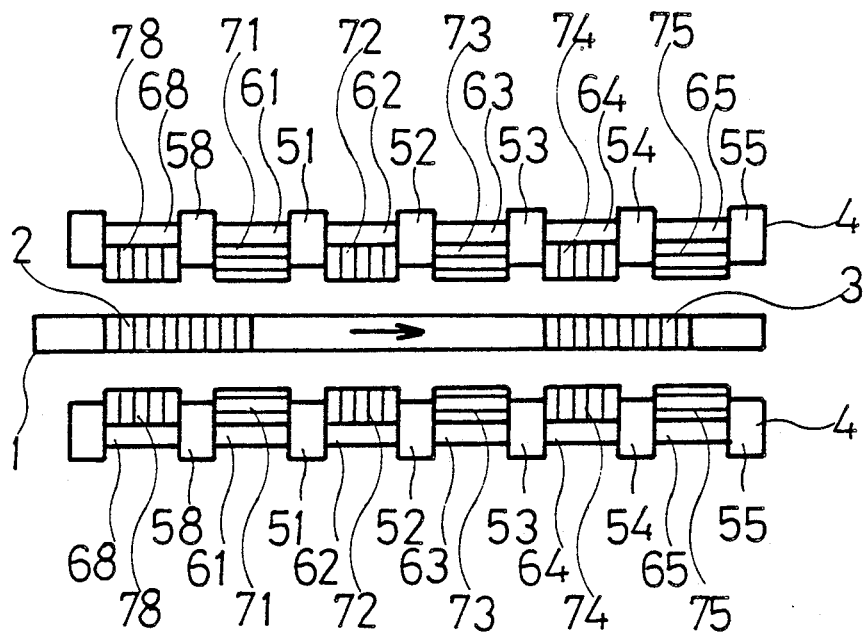
FIG. 11 is a side elevation of the eleventh embodiment of the present invention.

The eleventh embodiment shown in FIG. 11 works exactly according to the principles set out above with respect to the tenth embodiment with the exception that the moving element of the eleventh embodiment is a rod or plate disposed so as to be movable along the axis of the arrow and the stator comprises band shaped electrodes 61-68 formed above and below the moving element and at the inner sides facing the moving elements of which are formed P-type semiconducting layers 71, 73 and 75 and N-type semiconducting layers 72, 74, and 78. For convenience of disclosure the reference numerals used above in connection with the tenth embodiment have been used to denote corresponding elements in the eleventh embodiment. It will be understood that the description set out above with regard to the tenth embodiment may be considered to apply to the eleventh embodiment depicted in FIG. 11 with the exception that the moving element 1 is driven in a linear fashion rather than in the rotary fashion set out with respect to the tenth embodiment.

Figure 12:
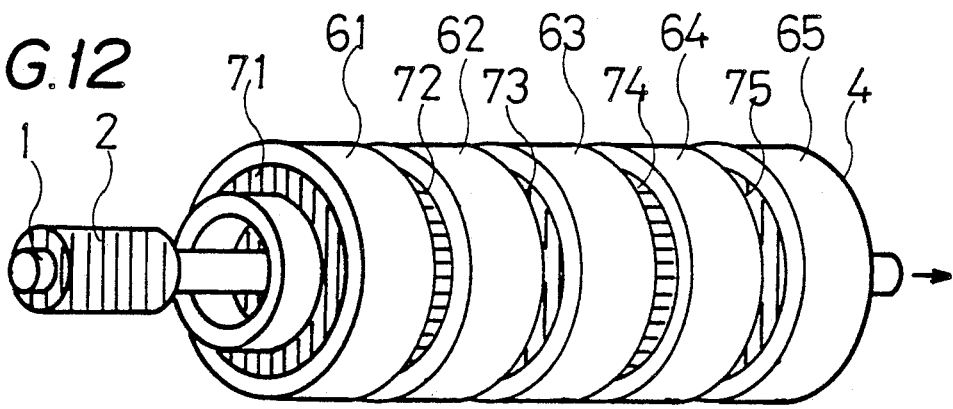
FIG. 12 is a perspective view of the twelfth embodiment of the invention, in which it will be noted that some of the electrodes of the moving element are obscured from view within the cylindrical structure of the stator.

Similarly to the eleventh embodiment, the twelfth embodiment shown in FIG. 12 works exactly according to the principles set out above with respect to the tenth embodiment with the exception that the moving element of the twelfth embodiment is a rod disposed so as to be movable along the axis of the arrow, and the stator is cylindrical and comprises annular band shaped electrodes 61-68 formed around the travel path of the moving element at the innersides, facing the moving elements, on which are formed P-type layers 72 and 74 and N-type semiconducting layers 71, 73, and 75.

For convenience of disclosure the reference numerals used above in connection with the tenth embodiment have been used to denote corresponding elements in the twelfth embodiment. It will be understood that the description set out above with regard to the tenth embodiment may be considered to apply to the twelfth embodiment depicted in FIG. 12 with the exception that the moving element 1 is driven in a linear fashion rather than in the rotary fashion set out with respect to the tenth embodiment.

Figure 13:
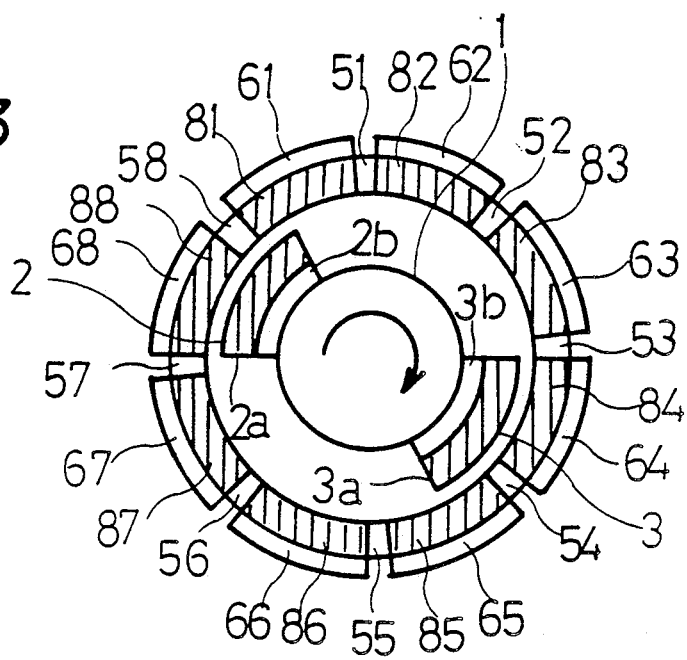
In FIG. 13 the thirteenth embodiment of the invention is depicted as it would appear viewed from the axial end of the rotor.

In a thirteenth embodiment of the invention shown in FIG. 13, the rotor 1 comprises rotor electrodes 2b and 3b, which are continuously connected to the negative terminal of the power source during operation of the motor and which comprise the N-type semiconducting layers 2a and 3a, are exactly the same as those set out above in the disclosure of the fourth embodiment, and the stator electrodes 61-68 and insulating layers 51-58 are exactly the same as those set out in connection with the tenth embodiment. The only differences between the stator of the tenth embodiment and that of the thirteenth embodiment being that, where the semiconductor layers of the tenth embodiment are alternately P-type and N-type, the semiconducting layers formed at the innersides of the stator electrodes of the thirteenth embodiment are all formed of the same type of either an N-type or a P-type semiconducting material.

The switching of the potentials of the stator electrodes of the thirteenth embodiment is carried out in synchronism with the rotation of the rotor in exactly the same manner as set forth above with respect to the previous embodiments.

For example, if the semiconducting layers of the stator electrodes are all of a P-type semiconducting material, when the rotor is at the position shown in FIG. 13 the stator electrodes 68 and 64 are connected to negative which causes the holes of the P-type semiconducting layers 88 and 84 to move to the sides near the electrodes 68 and 64 leaving only the electrons which are the minority carriers near the surface of the semiconducting layers 88 and 84. The electrons at the surface of the layers 88 and 84 repel the negatively charged electrodes 2a and 2b imparting a motive force on the rotor.

At this time the electrodes 61 and 65 are connected to the positive terminal of the power source causing the holes of the P-type semiconducting layers 81 and 85 to move to the surfaces thereof facing the rotor electrodes and thus attract the negatively charged rotor electrodes 2a and 3a.

As in the previous embodiments the polarities of the stator electrodes are changed stepwise around the the stator in synchronism with the movement of the rotor thus imparting a continuous motive force on the rotor 1.

Figure 14:
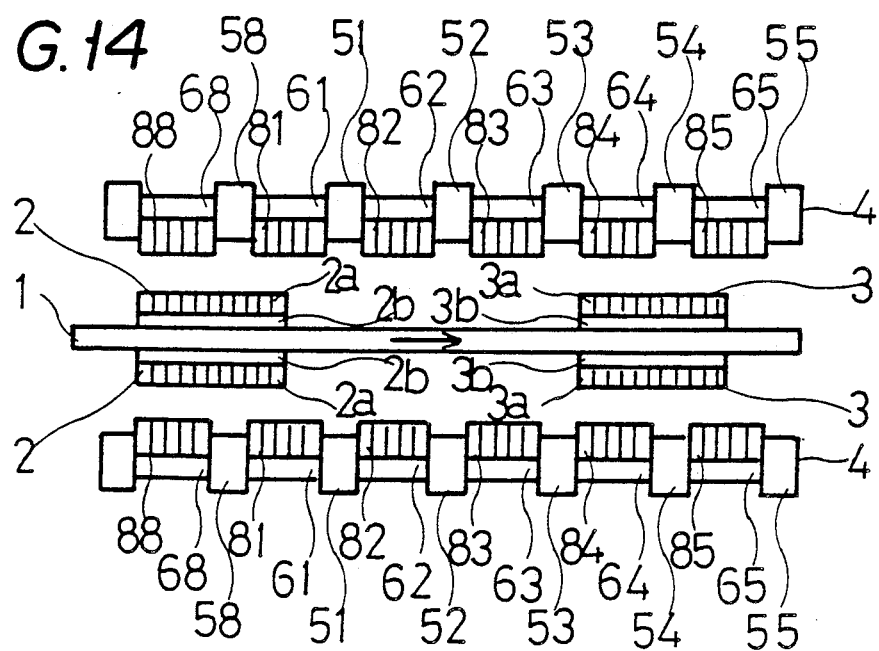
FIG. 14 is a side elevation of the fourteenth embodiment of the present invention.

The fourteenth embodiment shown in FIG. 14 works exactly according to the principles set out above with respect to the thirteenth embodiment with the exception that the moving element of the fourteenth embodiment is a rod or plate disposed so as to be movable along the axis of the arrow and the stator comprises band shaped electrodes 61-68 formed above and below the moving element and at the inner sides facing the moving elements on which are formed semiconducting layers 81, 82, 83, 84, 85, and 88.

For convenience of disclosure the reference numerals used above in connection with the thirteenth embodiment have been used to denote corresponding elements in the fourteenth embodiment. It will be understood that the description set out above with regard to the thirteenth embodiment may be considered to apply to the fourteenth embodiment depicted in FIG. 14 with the exception that the moving element 1 is driven in a linear fashion rather than in the rotary fashion set out with respect to that of the thirteenth embodiment.

Figure 15:
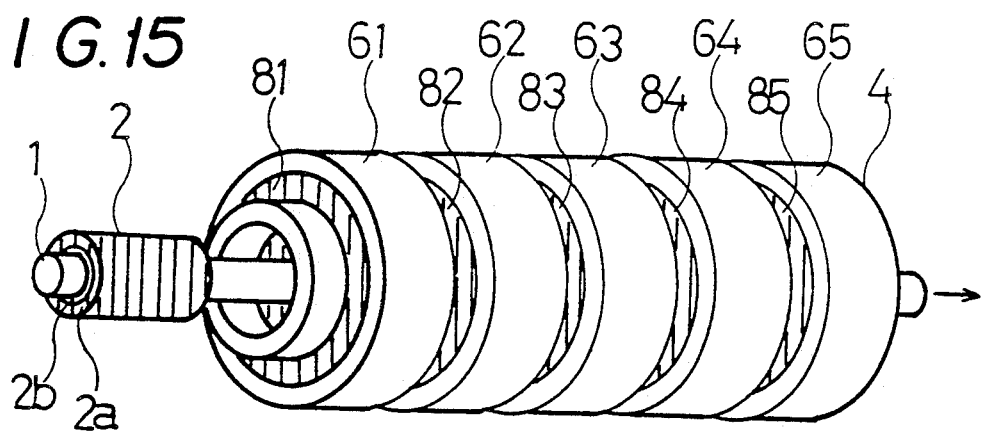
FIG. 15 is a perspective view of the fifteenth embodiment of the invention, in which it will be noted that some of the electrodes of the moving element are obscured from view within the cylindrical structure of the stator.

Similarly to the fourteenth embodiment, the fifteenth embodiment shown in FIG. 15 works exactly according to the principles set out above with respect to the thirteenth embodiment with the exception that the moving element of the fifteenth embodiment is a rod disposed so as to be movable along the axis of the arrow, and the stator is cylindrical and comprises annular band shaped electrodes 61-65 formed around the travel path of the moving element at the innersides, facing the moving element, on which are formed semiconducting layers 81-85.

For convenience of disclosure the reference numerals used above in connection with the thirteenth embodiment have been used to denote corresponding elements in the fifteenth embodiment. It will be understood that the description set out above with regard to the thirteenth embodiment may be considered to apply to the fifteenth embodiment depicted in FIG. 15 with the exception that the moving element 1 is driven in a linear fashion rather than in the rotary fashion set out with respect to the thirteenth embodiment.

Figure 16:
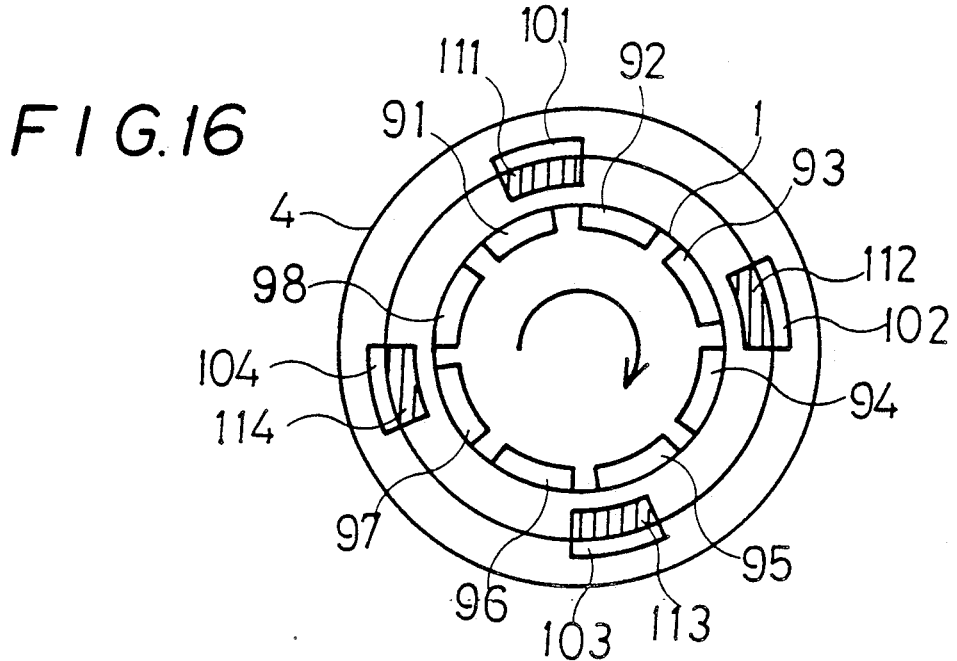
In FIG. 16 the sixteenth embodiment of the invention is depicted as it would appear viewed from the axial end of the rotor.

In the sixteenth embodiment of the present invention shown in FIG. 16, the stator comprises electrodes 101-104 equally spaced around the inner periphery of the casing 4 which is formed of an insulating material. The sixteenth embodiment of the invention differs from the previous embodiments disclosed above in that the moving element electrodes 91-98 rather than the stator element electrodes are switched alternately from negative to positive.

The stator electrodes of the motor according to the sixteenth embodiment comprise metallic conductor sections 101-104 and N-type semiconductor layers 111-114 formed on the inner sides thereof. The stator electrodes are continuously connected to negative while the motor is in operation.

When the rotor of the sixteenth embodiment is in the position shown in FIG. 16, the oddly numbered electrodes 91, 93, 95, and 97 are connected to the positive terminal of the power source and are therefore attracted toward the negative potential semiconductor layers 101-104 and when the momentum of their movement carries them to a position opposite the semiconductor layers 111-114, they are connected to the negative terminal of the power source thus causing them to be repelled by the stator electrodes. Thereafter at the rotor position slightly beyond that where the oddly number rotor electrodes are connected to the negative terminal of the power source, the adjacent evenly numbered rotor electrodes are connected to the positive terminal and therefore become attracted to the semiconducting layers 111-114 of the power source and thereby draw the rotor in the direction indicated by the arrow.

Figure 17:
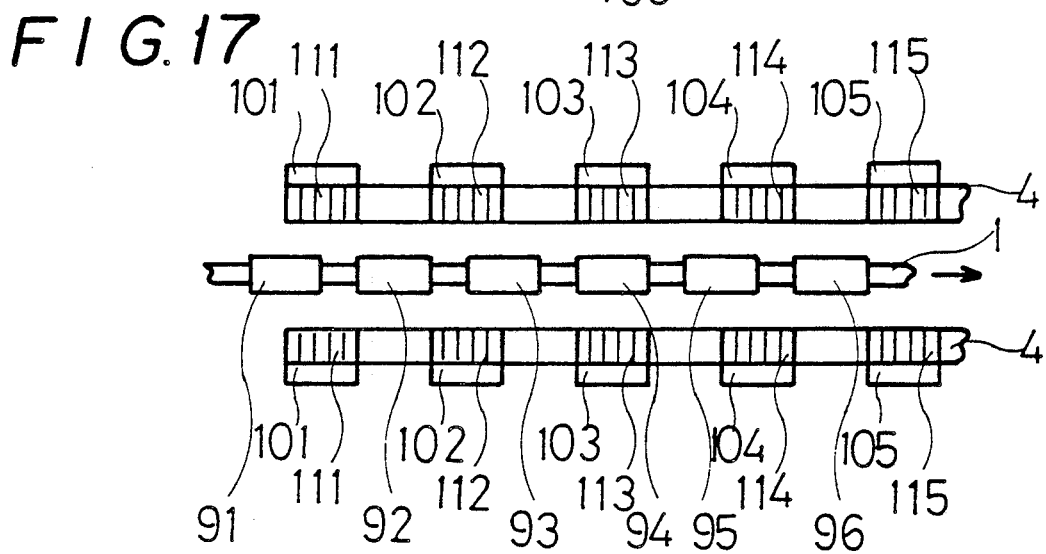
FIG. 17 is a side elevation of the seventeenth embodiment of the present invention.

The seventeenth embodiment shown in FIG. 17 works exactly according to the principles set out above with respect to the sixteenth embodiment with the exception that the moving element of the seventeenth embodiment is a rod or plate disposed so as to be movable along the axis of the arrow and the stator comprises five band shaped electrodes 101-105 formed above and below the moving element and at the inner sides facing the moving elements on which are formed semiconducting layers 111-115.

For convenience of disclosure the reference numerals used above in connection with the sixteenth embodiment have been used to denote corresponding elements in the seventeenth embodiment. It will be understood that the description set out above with regard to the sixteenth embodiment may be considered to apply to the seventeenth embodiment depicted in FIG. 17 with the exception that the moving element 1 is driven in a linear fashion rather than in the rotary fashion set out with respect to that of the sixteenth embodiment.

Figure 18:
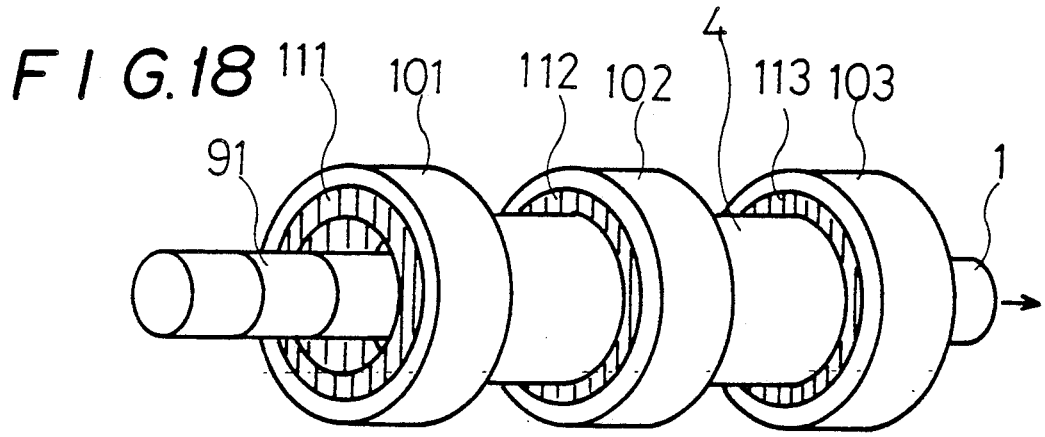
FIG. 18 is a perspective view of the eighteenth embodiment of the invention, in which it will be noted that some of the electrodes of the moving element are obscured from view within the cylindrical structure of the stator.

Similarly to the seventeenth embodiment, the eighteenth embodiment shown in FIG. 18 works exactly according to the principles set out above with respect to the sixteenth embodiment with the exception that the moving element of the eighteenth embodiment is a rod disposed so as to be movable along the axis of the arrow, and the stator is cylindrical and comprises three annular band shaped electrodes 101-103 formed around the travel path of the moving element at the innersides, facing the moving element, on which are formed semiconducting layers 111-113.

For convenience of disclosure the reference numerals used above in connection with the sixteenth embodiment have been used to denote corresponding elements in the eighteenth embodiment. It will be understood that the description set out above with regard to the sixteenth embodiment may be considered to apply to the eighteenth embodiment depicted in FIG. 18 with the exception that the moving element 1 is driven in a linear fashion rather than in the rotary fashion set out with respect to the sixteenth embodiment.

Figure 19:
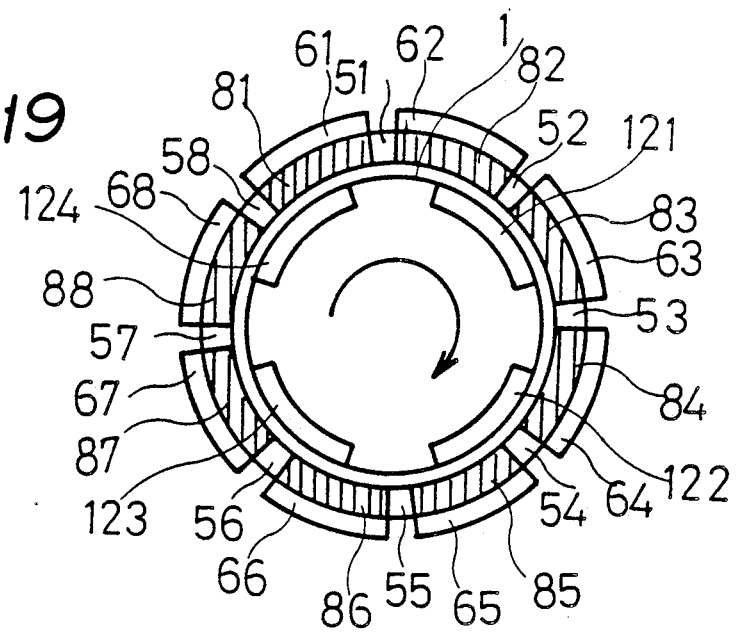
In FIG. 19 the nineteenth embodiment of the invention is depicted as it would appear viewed from the axial end of the rotor.

In the nineteenth embodiment depicted in FIG. 19 the rotor 1 comprises four metallic electrodes 121-124 which are continuously connected to positive. The stator of the nineteenth embodiment is exactly like that of the thirteenth embodiment in that it comprises a set of metallic electrodes 61-68 at the inner sides of which, facing the rotor, are formed semiconducting layers 81-88 which may be of either P-type or N-type semiconducting material.

In a case where the layers 81-88 of the nineteenth embodiment are formed of an N-type semiconducting material and the rotor electrodes 121-124 are in the positions depicted in the figure, the odd numbered stator electrodes 61, 63, 65, and 67 are connected to negative which causes a large number of electrons to appear near the inner surface of the respective semiconducting layers 81, 83, 85, and 87 facing the positive polarity electrodes 121-124 thereby attracting them so as to move the rotor in the direction indicated by the arrow in FIG. 19. As in the above embodiments, when the electrodes reach a position just opposite the positive electrode layers 81, 83, 85, and 87, the polarity thereof is switched to negative and the adjacent electrodes 62, 64, 66, and 68 are connected to negative so that the moving element 1 is again driven in the direction indicated by the arrow in the figure.

Figure 20:
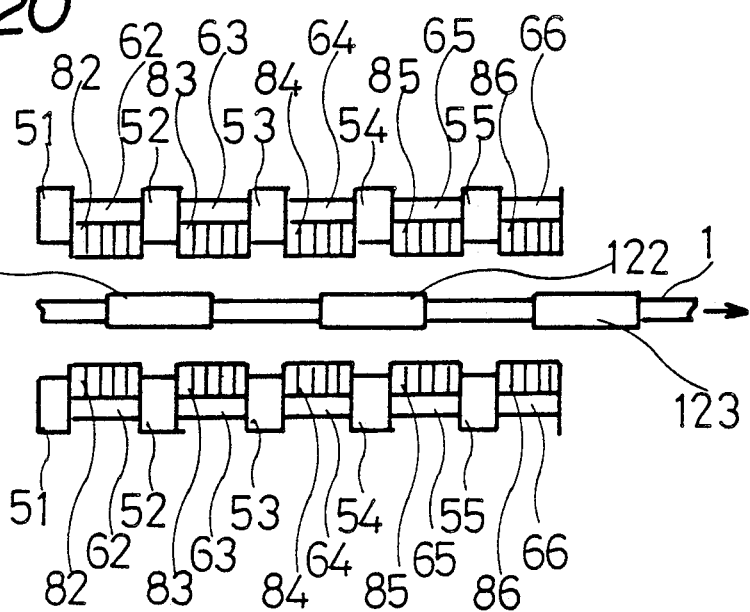
FIG. 20 is a side elevation of the twentieth embodiment of the present invention.

The twentieth embodiment shown in FIG. 20 works exactly according to the principles set out above with respect to the nineteenth embodiment with the exception that the moving element of the twentieth embodiment is a rod or plate disposed so as to be movable along the axis of the arrow in FIG. 20 and the stator comprises five band shaped electrodes 62-66 formed above and below the moving element and at the inner sides facing the moving element on which are formed semiconducting layers 82-86 between which are formed the insulating layers 51-55.

For convenience of disclosure the reference numerals used above in connection with the nineteenth embodiment have been used to denote corresponding elements in the twentieth embodiment. It will be understood that the description set out above with regard to the nineteenth embodiment may be considered to apply to the twentieth embodiment depicted in FIG. 20 with the exception that the moving element 1 is driven in a linear fashion rather than in the rotary fashion set out with respect to that of the nineteenth embodiment.

Figure 21:
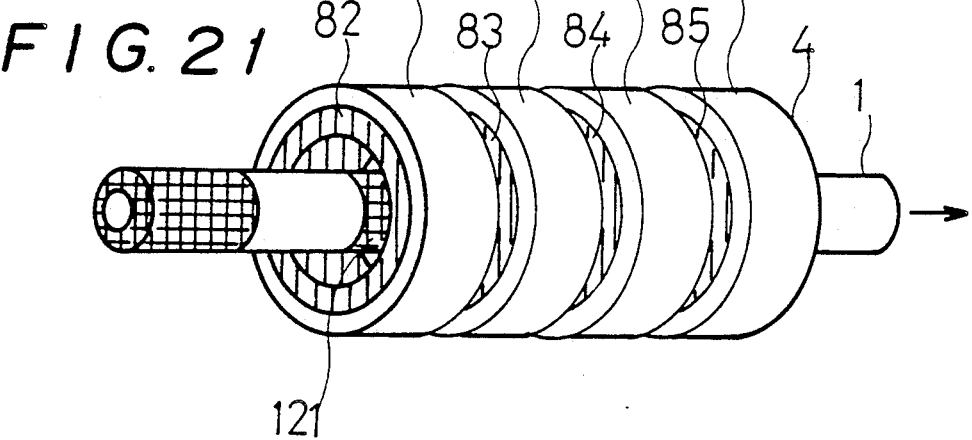
FIG. 21 is a perspective view of the twenty-first embodiment of the invention, in which it will be noted that some of the electrodes of the moving element are obscured from view within the cylindrical structure of the stator.

Similarly to the twentieth embodiment, the twenty-first embodiment shown in FIG. 21 works exactly according to the principles set out above with respect to the nineteenth embodiment with the exception that the moving element 1 of the twenty-first embodiment is a rod disposed so as to be movable along the axis of the arrow, and the stator is cylindrical and comprises four annular band shaped electrodes 62-55 formed around the travel path of the moving element at the innersides, facing the moving element, on which are formed semiconducting layers 82-85.

For convenience of disclosure the reference numerals used above in connection with the nineteenth embodiment have been used to denote corresponding elements in the twenty-first embodiment. It will be understood that the disclosure set out above with regard to the nineteenth embodiment may be considered to apply to the twenty-first embodiment depicted in FIG. 21 with the exceptions that the moving element 1 is driven in a linear fashion rather than in the rotary fashion set out with respect to the nineteenth embodiment and the twenty-first embodiment comprises fewer stator electrodes.

The present invention makes possible to manufacture easily a motor of a very small size. If an intrinsic semiconductor material such as Si is used for the bodies of the moving element 1 and the stator 4, and a P-type or N-type semiconductor material is used for the floating electrodes 2 and 3, the electrostatic motor according to the invention can be manufactured by using a semiconductor process, without a mechanical step.

For example, in case of manufacturing a motor as shown in FIG. 1, a predetermined quantity of donor impurity such as P, Sb or As (or acceptor impurity such as B, Al or Ge) is doped at predetermined positions, at which the floating electrodes 2 and 3 are to be formed, into a substrate made of semiconductor such as Si, Ge or GaAs with a predetermined thickness.

A metal such as Al, Au, Ag, Cu or Pt is deposited on predetermined portions, at which the electrodes 61 to 68 and the leads thereof are to be formed, by means of vapor deposition, sputtering, ion-plating or chemical vapor deposition process.

The external shape of the rotor 1 and stator 4 and the gap between the rotor and the stator are obtained by using photoetching cutting process, laser cutting treatment or the like.

Such a manufacturing process makes possible to manufacture an electro-static motor of an extremely small size accurately and is remarkably suited for mass-production.

It will be understood from the above disclosure that a motor in accordance with the present invention, unlike prior art electric motors, functions by exploiting static repulsion and that numerous variations on the above embodiments are possible. The above embodiments therefore are intended only as examples for illustrating the principles of the invention and are in no way intended to limit the invention, beyond scope and spirit set forth in the appended claims.

What is claimed is:

1. A process for the production of a motor comprising the steps of:
   providing a semiconductor substrate;
   doping a predetermined quantity of donor or acceptor impurity at a predetermined position into the semiconductor substrate;
   depositing a metal on another predetermined position of the semiconductor substrate; and
   cutting the semiconductor substrate to form two relatively movable motor members.

2. A process as claimed in claim 1; wherein said depositing step is performed by means of vapor deposition.

3. A process as claimed in claim 1; wherein said cutting step is performed by means of photoetching.

4. A process as claimed in claim 1; wherein said depositing step is performed by means of sputtering.

5. A process as claimed in claim 1; wherein said depositing step is performed by means of ion-plating.

6. A process as claimed in claim 1; wherein said depositing step is performed by means of chemical vapor deposition.

7. A process as claimed in claim 1; wherein said cutting step is performed by means of laser treatment.

8. A method of producing a semiconductor motor, comprising the steps of: preparing a semiconductor substrate; doping impurity selectively into the semiconductor substrate to form an active electrode region within which movable carriers can be induced in response to application of an electric field so as to generate an electromotive force; forming on the semiconductor substrate a drive electrode region to be used for the application of the electric field; cutting the semiconductor substrate to form one motor member having the active electrode region and another motor member having the drive electrode region; and coupling the two motor members movably relative to one another to constitute a semiconductor motor such that the active electrode region and the drive electrode region are arranged in spaced relation to each other to generate the electromotive force.

9. A method according to claim 8; wherein the drive electrode region is formed by selectively depositing metal material on the semiconductor substrate.

10. A method according to claim 8; wherein the semiconductor substrate is cut by means of photo-etching.

11. A method according to claim 7; wherein the semiconductor substrate is cut by means of laser treatment.

12. A method of producing a semiconductor motor comprising the steps:
    providing a semiconductor substrate;
    forming an active electrode region in the semiconductor substrate at one section thereof by selective doping of impurity;
    forming a drive electrode region on the semiconductor substrate at another section thereof; and
    cutting the semiconductor substrate to form one motor member having the active electrode region and another complementary motor member having the drive electrode region;
    whereby the two motor members can be coupled together in spaced-apart relation to undergo relative movement to define a semiconductor motor.

13. A method according to claim 1; wherein the step of forming a drive electrode region comprises forming the drive electrode region by chemical vapor deposition of a metal on the semiconductor substrate.

14. A method according to claim 12; wherein the step of forming a drive electrode region comprises forming the drive electrode region by vapor deposition of a metal on the semiconductor substrate.

15. A method according to claim 12; wherein the step of forming a drive electrode region comprises forming the drive electrode region by sputtering a metal on the semiconductor substrate.

16. A method according to claim 12; wherein the step of forming a drive electrode region comprises forming the drive electrode region by ion-plating a metal on the semiconductor substrate.

17. A method according to claim 12; wherein the step of cutting the semiconductor substrate comprises cutting the semiconductor substrate by etching.

18. A method according to claim 12; wherein the step of cutting the semiconductor substrate comprises cutting the semiconductor substrate by a laser.

* * * * *